US007323881B2

(12) United States Patent
Lopez Alvarez

(10) Patent No.: US 7,323,881 B2
(45) Date of Patent: Jan. 29, 2008

(54) PROCESS AND APPARATUS FOR EVALUATING THE DEGREE OF VACUUM IN CLOSED BODIES WITH TRANSPARENT WALLS

(75) Inventor: Diego Lopez Alvarez, La Garriga (ES)

(73) Assignee: Grifols, S.A., Barcelona (ES)

( * ) Notice: Subject to any disclaimer, the term of this patent is extended or adjusted under 35 U.S.C. 154(b) by 0 days.

(21) Appl. No.: 11/556,772

(22) Filed: Nov. 6, 2006

(65) Prior Publication Data

US 2007/0103169 A1    May 10, 2007

(30) Foreign Application Priority Data

Nov. 7, 2005    (ES)    ............... 200502702

(51) Int. Cl.
*H01H 9/50* (2006.01)
*G01L 21/30* (2006.01)
*G01M 3/34* (2006.01)

(52) U.S. Cl. ............... 324/536; 324/460; 73/49.3
(58) Field of Classification Search ............... 324/536, 324/512, 500, 395, 409, 410, 122, 460, 158.1; 123/406.72; 73/52, 45.4, 49.3, 37
See application file for complete search history.

(56) References Cited

U.S. PATENT DOCUMENTS

| 4,152,213 | A | * | 5/1979 | Ahnell ............... 435/34 |
| 4,517,827 | A | * | 5/1985 | Tapscott ............... 73/45.4 |
| 4,546,319 | A | * | 10/1985 | Pfaff et al. ............... 324/460 |
| 4,882,543 | A | * | 11/1989 | Siegal ............... 324/460 |
| 5,105,654 | A | * | 4/1992 | Maruyama et al. ............... 73/49.3 |
| 5,399,973 | A | * | 3/1995 | Kitamura et al. ............... 324/424 |
| 6,347,546 | B1 | * | 2/2002 | Rule ............... 73/49.3 |
| 6,446,493 | B1 | * | 9/2002 | Lehmann ............... 73/49.3 |

* cited by examiner

*Primary Examiner*—Vincent Q. Nguyen
*Assistant Examiner*—Hoai-An D. Nguyen
(74) *Attorney, Agent, or Firm*—Darby & Darby, P.C.

(57) ABSTRACT

The invention is based on feeding the closed bodies to be evaluated to a station for the application of high voltage for the formation of the arc across the inner space of the body and capturing the arc formed by means of a CCD camera which will compare, adjustably, the luminous intensity of the arc created within the body subjected to checking with a threshold value determining whether the luminous intensity is above or below the threshold, which will be the rejection threshold, rejecting the bodies which do not comply with the predetermined threshold value, separating them from the whole of the accepted bodies.

16 Claims, 15 Drawing Sheets

PROCESS AND APPARATUS FOR EVALUATING THE DEGREE OF VACUUM IN CLOSED BODIES WITH TRANSPARENT WALLS

CROSS-REFERENCE TO RELATED APPLICATIONS

This application claims priority to Spanish patent application Ser. No. 200502702 filed Nov. 7, 2005, the contents of which are hereby incorporated by reference in its entirety.

DESCRIPTION

The present invention is intended to disclose a process and its corresponding apparatus for evaluating the degree or level of vacuum in closed bodies with transparent walls, such as containers, which contain products, for example vials which contain lyophilised products.

The aim of the present invention consists in the development of a process and apparatus capable of detecting the presence/absence of vacuum inside closed bodies with transparent walls, for example, vials containing lyophilised products, one of the characteristics of the process and apparatus being their non-destructive nature, intended for inspecting 100% of the closed bodies in a specific manufacturing process.

It should be observed that the mention of transparent walls comprises all those forms of walls which permit the passage of light to a greater or lesser degree, therefore including bodies with tinted, matt, "smoked" walls and others.

As is known, a wide variety of products are presented in containers closed with a certain degree of vacuum, for example, pharmaceutical products which are marketed in lyophilised form, such as haemo-derivatives, biological products, vaccines, antibiotics, special collyriums and also biotechnological products (recombinant products), veterinary products (similar to pharmaceutical ones) and others.

The present invention is therefore applicable in general to closed bodies which need to have in their interior a certain degree of vacuum. As a specific example, without it being limiting for the invention, reference will be made to the application to vials which contain lyophilised products, although the invention could be applied to any other closed bodies with transparent walls.

Lyophilisation is a drying process in which water is extracted from the product under vacuum conditions. The extraction of the water and the vacuum conditions within the vial confer on the product an adequate shelf life, on condition that the vial does not lose its airtightness.

Besides the question of shelf life, it is necessary to regard with even greater importance the maintenance of the sterile conditions. In this respect, ensuring the presence of a vacuum within a sealed vial is a guarantee that the medicine maintains its sterile and stable state from lyophilisation until its administration to the patient.

The possibility of the vials losing their internal vacuum is determined by the handling to which they are subjected during manufacture, including the extraction of the vial from the lyophilising unit; transport from the lyophiliser to the encapsulator; discharge of the vial into the encapsulating or sealing machine, withdrawal of the protective element from the stopper, feeding the capsule onto the vial and encapsulation or sealing of the vial.

It is therefore necessary to check that after these necessary handling operations of the production cycle, the interior of the vial has not lost the level of vacuum achieved during the lyophilisation process.

For this reason, various attempts have been made in the pharmaceutical industry for checking the maintenance of the vacuum in vials of pharmaceutical products, and likewise both the FDA in the U.S.A. and the regulations concerning medicines in the European Union also coincide in this respect.

For these reasons, the inventors carried out studies and experiments with the aim of obtaining a process and apparatus which make it possible to carry out easy, automated 100% checking of vials of medicines after different stages of the industrial processing of same, for example: after the sealing of the vial, after a quarantine period (if the medicine requires this process), prior to labelling, or after labelling and before the vials are placed in boxes and cases.

At present, the known processes for evaluating the vacuum inside the vials belong basically to two types: destructive and non-destructive.

The destructive systems determine the level of vacuum by immersion of the vial in water so that the level of vacuum (equivalently, its reduced pressure) can be obtained by calculating (by means of weighing) the quantity of water absorbed when the vial is unsealed, submerged in a tank. These processes are economic since they are reduced to the checking of a small number of vials selected at random. Nevertheless, the high cost of the vials containing lyophilised sterile products, combined with the reduced number of units in the batches manufactured (between 3000 and 7000 units per batch) mean that the destructive systems are not very advisable because of the costs which they cause.

The non-destructive processes make it possible to determine the existence of a vacuum inside the vial without the need for destruction of same, these processes basically including the glow discharge method. This method consists in applying an electrical field with a high potential difference to the vial. It has been observed that if the level of vacuum within the vial exceeds a certain value, an electric arc is generated which passes through the vial between the external electrodes applied to same, customarily along a diameter. In other words, there is a level of vacuum below which said electric arc is not generated.

The electric arc is easily identifiable by the operative charged with the inspection, since it appears in the form of light, that is to say, luminescence, so that in the case of a vial having a high level of vacuum, the luminescence is clear and very visible, while in the case of a vial having a low level of vacuum, that is to say, which is to be rejected, the luminescence is not established and in any case has a diffuse and not very distinguishable appearance.

The procedure consists in applying a manual element with a high potential difference to the vial so that the operative can observe the formation of the luminescence or the lack thereof.

As will be understood, the manual methods have the essential disadvantage of leaving to the operative's judgement the acceptance or rejection of a vial, the lack of homogeneity of the checking, the possibility that the electric arc may have an effect on the lyophilised product and a high degree of effort, both visual and mental, on the part of the operative to keep his attention and concentration constant, which may represent very unfavourable working conditions which may affect the proper course of the process.

In order to solve or at least reduce the drawbacks of the manual systems, automated processes have been developed in which the acceptance of correct vials is improved according to a criterion independent of the operative by checking the passage of the electric arc above the product but without having an effect on same, obtaining a higher degree of homogeneity in production and relieving the operative from carrying out a routine, repetitive task with a great effort of concentration and attention.

The automated systems known at present are based on the measurement of the electric current which passes through the vial when a specific potential difference is applied thereto (arc generation).

The newest systems employ laser technology for checking the level of vacuum.

However, the processes and apparatus known at present which pursue the automation of the checking of the degree of vacuum inside the vials have serious drawbacks, especially because of the high cost of the equipment and the relative inaccuracy in the measurement of the electric discharge currents produced.

In order to solve the above-mentioned problems of the state of the art, the inventors carried out tests and experiments giving rise to the present invention, which is based on a process of optical detection by means of artificial vision combined with the application of high voltage to the vial, under very homogeneous conditions, thereby permitting easy accessibility to a process for inspection of vacuum in vials which is highly effective, and under economic conditions, which makes it possible to extend its use to small or medium-sized firms, for whom it is not economic to use the complicated and expensive processes known at present.

Moreover, the process of the present invention is very simple because of its qualitative approach to acceptance/rejection in comparison with those known at present in the state of the art, which are quantitative because of the measurement of the level of vacuum by the measurement of the discharge currents.

Fundamentally, the process of the present invention is based on the application of the following consecutive stages:
feeding the containers to be inspected in succession;
transferring the containers to means bearing the earth electrode;
moving the containers along the path determined by the means bearing the earth electrode in contact with same;
application of one or more pre-ionisation charges at one or more points on the transport path;
application of one or more checking electrodes applying one or more high voltage charges in order to produce the electric arc across the container between said electrodes and the earth electrode or electrodes;
inspecting the arc or arcs formed inside the container by means of respective artificial vision cameras;
subjecting the reading taken by the artificial vision cameras to an arc evaluation algorithm;
referencing the containers according to the result of the arc evaluation for their selection;
generating signals for differentiated exit of the containers.

The means bearing the earth electrode may be fixed or movable.

The present invention also comprises an apparatus for implementing the process of the present invention, which in the specific case which has been shown as a non-limiting example comprises guide means for the containers being checked, which may be of a desired form but which in an exemplary embodiment will consist of one or more circular structures with a revolving plate bearing the containers which it will receive, from a feeding station, proceeding from earlier stages of the process, and in the course of which will be arranged the pre-ionisation elements, arc production elements, CCD camera and stations respectively for the exit of the accepted containers and for the rejection of the containers which do not have the expected degree of vacuum. In order to achieve constant conditions in the application of the high electrical potential intended to form luminescence inside the container, the apparatus comprises a guide parallel to that for movement of the containers, with which guide the latter are in contact and which in the case where the apparatus is produced by means of a revolving plate, will consist of a disc coaxial with said plate and located at a higher level, adjustable to the dimensions of the container, in a position such that the arc is produced in all cases above the lyophilised substance contained in the container. The CCD camera will be protected externally in order to avoid electrical influences and those from flashes produced, and the entire assembly of the apparatus will be contained inside an enclosure intended to absorb the luminous radiation, avoiding any type of reflection and external luminosity and making it possible to evaluate solely the intensity of the arc produced. Said enclosure contains all the functional devices of the apparatus, communicating with the outside simply through the entry and exit guides for the containers.

The present invention will allow of numerous variants in the actual production of the mechanical systems incorporated therein, thus, for example, the inspection system may comprise a plurality of entry doors, a plurality of exit doors and a plurality of guides for the containers to be checked.

In a particular case with a plurality of entries, a machine in tandem form could be provided, with two circular plates or starwheels, each of which would handle its own checked containers, thereby increasing the speed of the machine.

A plurality of entries for containers could also be provided for the same plate or starwheel of the machine, in which case an entry channel with multiple lines of containers to be checked will be presented to the revolving plate in order to obtain multiple, simultaneous entry of containers to the plate.

Likewise, a single entry and two plates could be provided.

Similarly, the transport of the containers to be checked may assume many different forms which will not alter the essence of the invention, such as:
linear movement devices, such as a conveyor belt, feed worm, etc;
circular feed devices, such as a starwheel, plate and the like;
specific handling devices, such as clamps which transport the container from one point to another of the system;
a robotised device.

As is clear, all these individual forms will be applicable to the invention without signifying a variation from the essence thereof.

In like manner, the apparatus could have a plurality of pre-ionisation electrodes, that is to say, electrodes prior to the actual inspection, so that the use of a plurality of electrodes may increase the speed of the machine, since at the inspection point the container will achieve the luminescence more rapidly.

A plurality of inspection electrodes may also be provided and, in the same way, a plurality of inspection cameras, so that the use of multiple electrodes and enclosures could increase the reliability of the system for at least two reasons:
in the case where an inspection electrode or its associated camera was damaged, the system could continue to function, making use of the other electrode(s) and camera(s);

a situation might arise in which a product required two successive inspections, in which case the container would be regarded as correct if the two successive inspections gave a positive result.

Earth electrodes of different geometry may also be provided, since what is essential is the application of the high voltage in such a way that the arc is produced passing through the inner space of the container which is intended for a specific degree of vacuum. Among the different forms may be cited, without being limiting, electrodes with pointed end, with circular end, or forked, etc. As is clear, the different geometries of the electrodes would affect the form and appearance of the electric arc produced inside the container, for example its thickness.

It should also be borne in mind that the present invention is applicable to many types of containers which need to have a specific degree of vacuum in their interior, among which may be included not only the containers cited preferentially in the course of this description as a specific embodiment, but also, for example: ampoules, containers for taking blood, tubes for the determination of concentration of gases, light bulbs, etc. Likewise, the inspection system may use different types of camera apart from the CCD camera which is cited repeatedly as an example in the present description. The cameras which may be used are those commercially available at any time in the technological development of same, since their intervention in the invention will not vary because of the change in the specific characteristics of the camera, which do not actually form part of the invention, thus, for example, linear cameras, CMOS cameras and others known at present or which may be developed in the future may be cited. In all cases, account should be taken of the simplicity, speed of image capture, robustness, image quality, cost, etc.

It should likewise be mentioned that the inspection system may employ different algorithms or forms of processing the image captured, for determination of the acceptance/rejection of the container placed under vacuum, for example:

by threshold value (above a value, the product is accepted), by level (within a range, with predetermined maximum and minimum, the product is accepted), by chromatic identification (by the distribution of the colours red, green and blue of the image, their maximum values, etc.)

by the form of the luminosity, by comparison with a master image which is regarded as good, etc.

As is clear, these algorithms may be applied individually or several at a time for the purpose of increasing the reliability and consistency of the system.

It should likewise be mentioned that the inspection system may function without an enclosure, since the apparatus can perform all its functions without the enclosure, the purpose of which is simply to isolate the external luminosity with respect to the devices for detection and evaluation of the arc; thus, for example, the light surrounding the inspection apparatus could be eliminated by means of digital processing of the image, or the container to be checked could be conducted inside a tube to the inspection point.

The inspection system may also consist of more than one rejection point, since space and/or size limitations could make it necessary to have more than one rejection point. On detecting that one of the rejection areas has been filled, access to that zone could be blocked and the passage of the fresh rejects to a second rejection zone could be permitted. This form of process could be used for classifying containers.

It should also be taken into account that the inspection system may be automatic or manual. Although the description refers to an automatic version, the present invention could also comprise a manual, table-top system in which an operator feeds in the containers by placing them between the inspection electrode and the camera, so that he could actuate a control for ionisation of the container and the camera would capture the image. Afterwards, an acoustic luminous signal or a small screen could inform the operator whether the container is correct or not.

In particular, these table-top types of equipment could be of use:

for sampling if there is no automatic system, for checking the correct functioning of the automatic system installed in production by comparing the results of the automatic and manual inspections.

It should likewise be observed that the process and apparatus of the present invention could be used for quantifying the level of vacuum in the container to be checked, since, although the description of the patent has been provided on the basis of a concrete example of classification of the containers as correct or incorrect depending on whether they reach a specific level of vacuum, it would also be possible to quantify the level of vacuum of the inner space of the container, since the images captured exhibit quantifiable differences, so that the apparatus could classify the containers by degrees or levels of vacuum with corresponding exits grouping them together according to the degree of vacuum inside them.

For greater understanding thereof, drawings of an embodiment of a preferred example of the present invention, applied to containers of lyophilised products, are appended hereto by way of non-limiting example.

Figure 1:
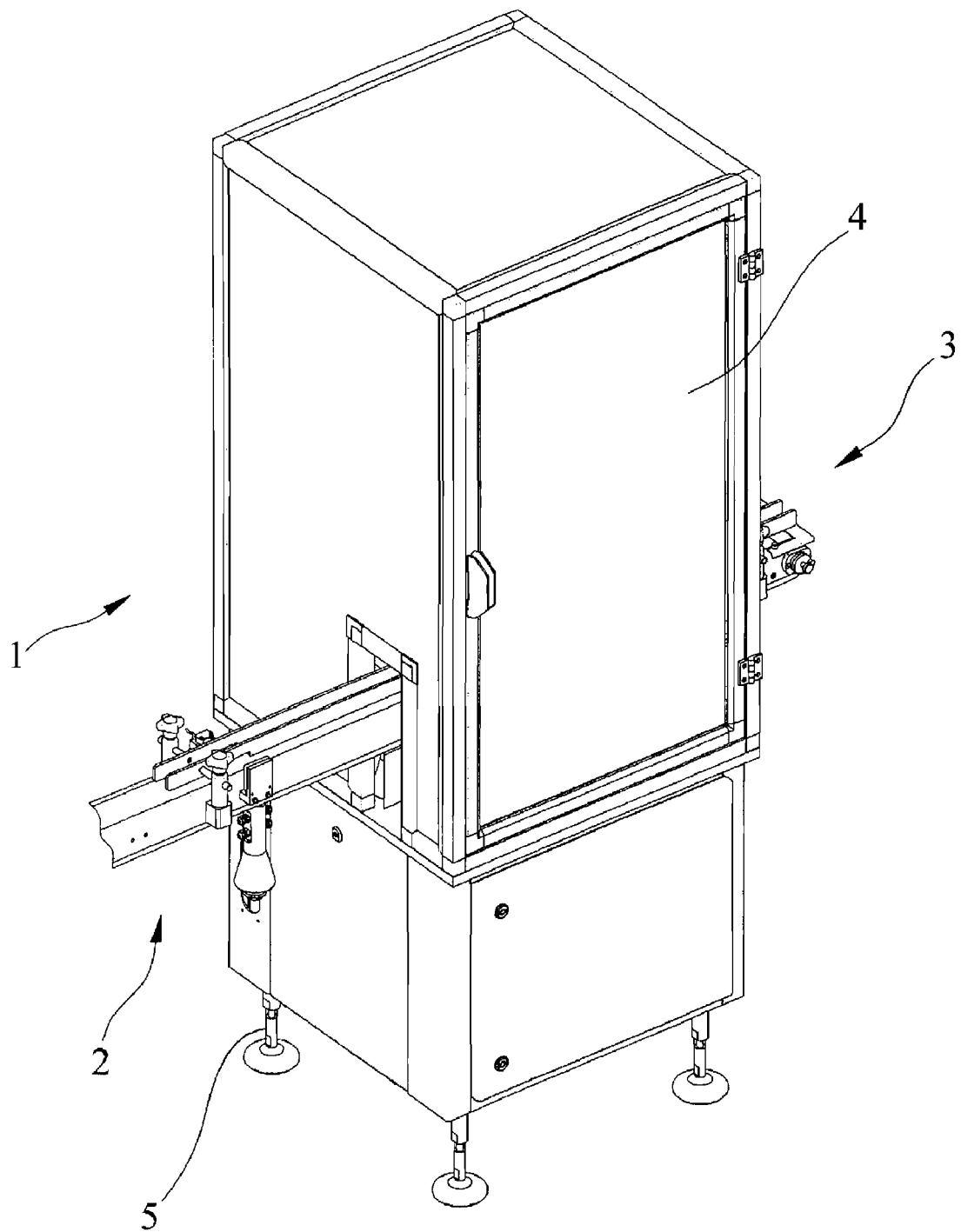
FIG. 1 shows an external view of an exemplary embodiment of an apparatus according to the present invention contained within an anti-reflective enclosure.
Figure 2:
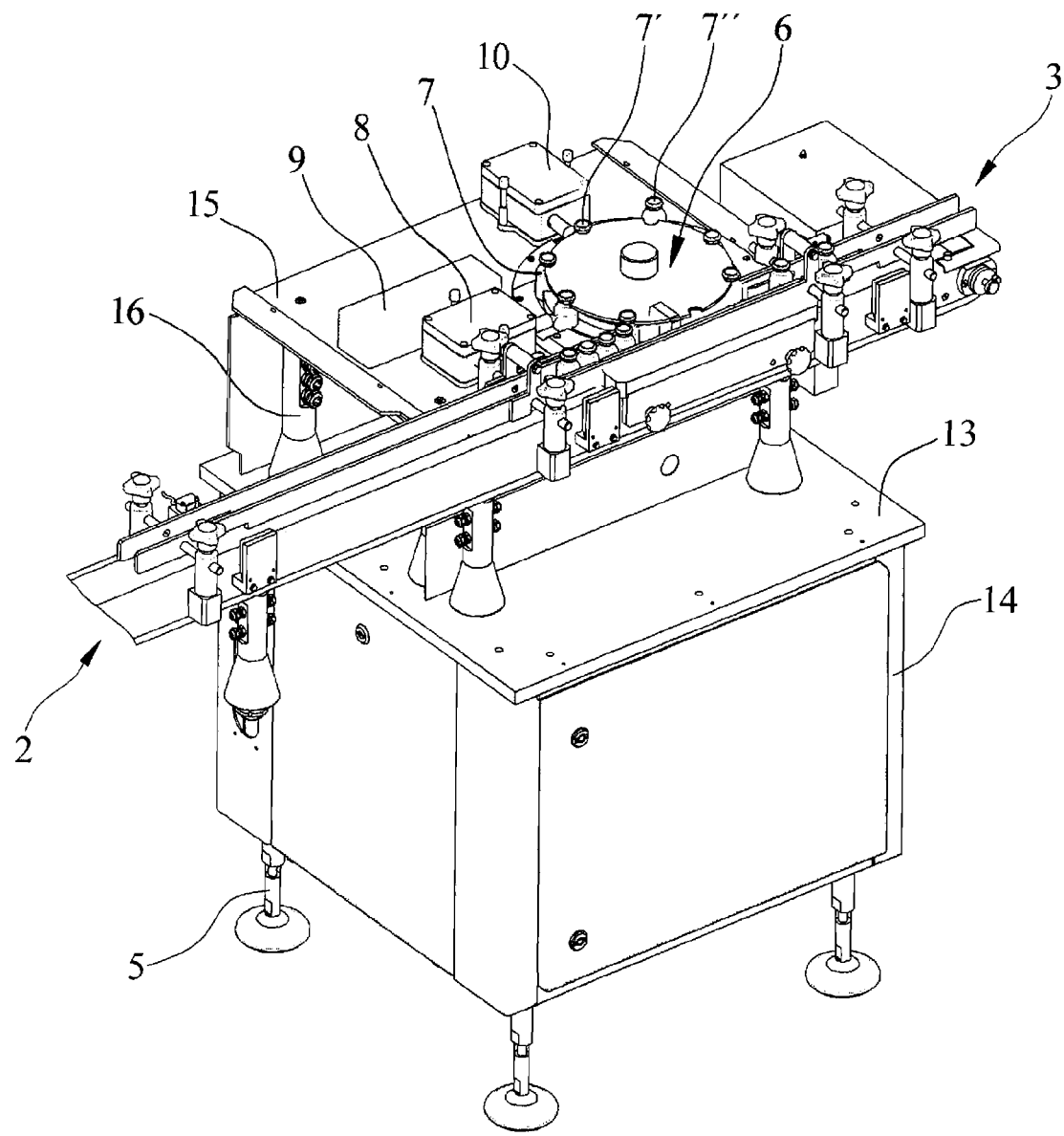
FIG. 2 shows a perspective view of the actual apparatus.
Figure 3:
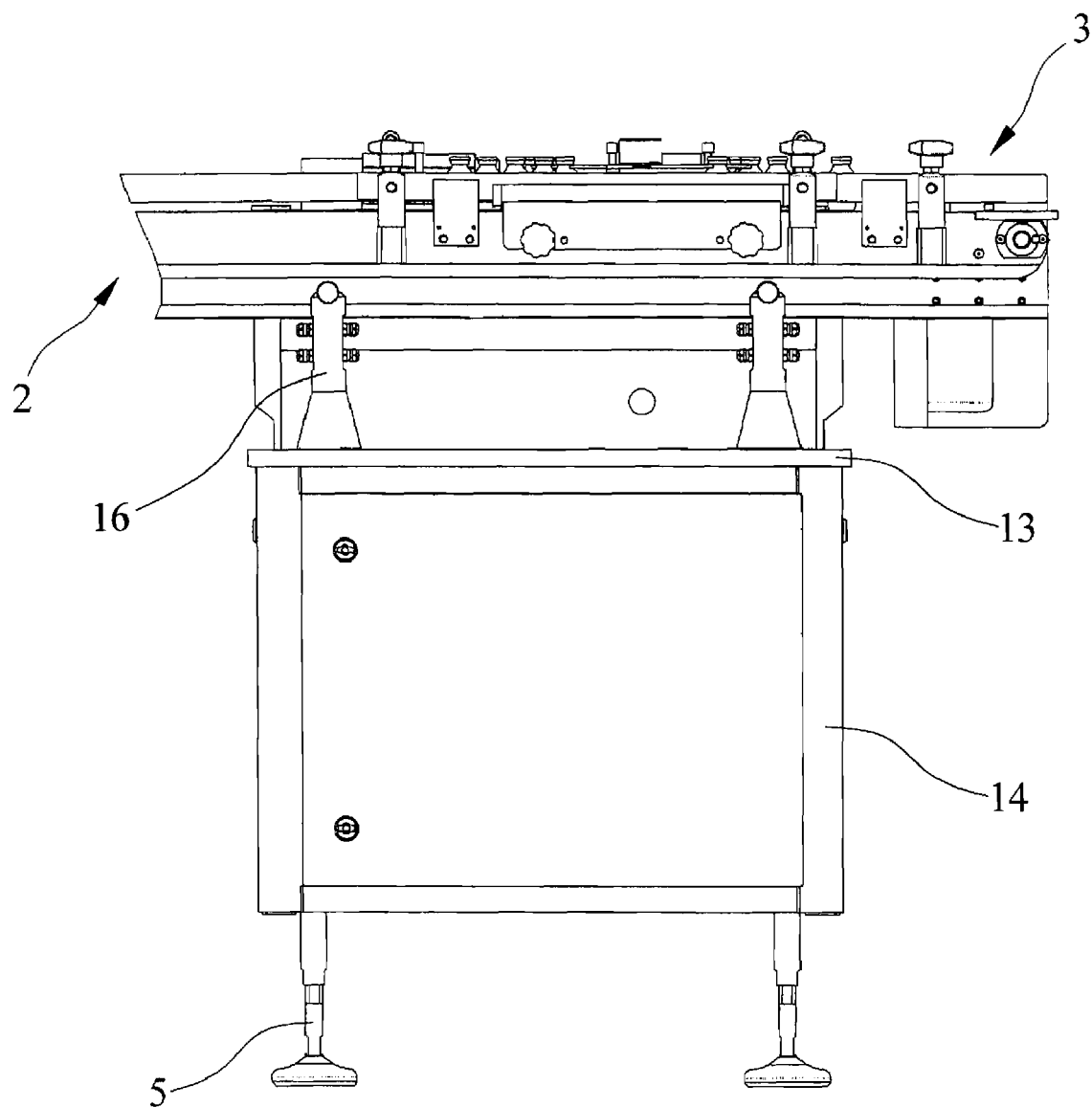
FIG. 3 shows a view in front elevation.
Figure 4:
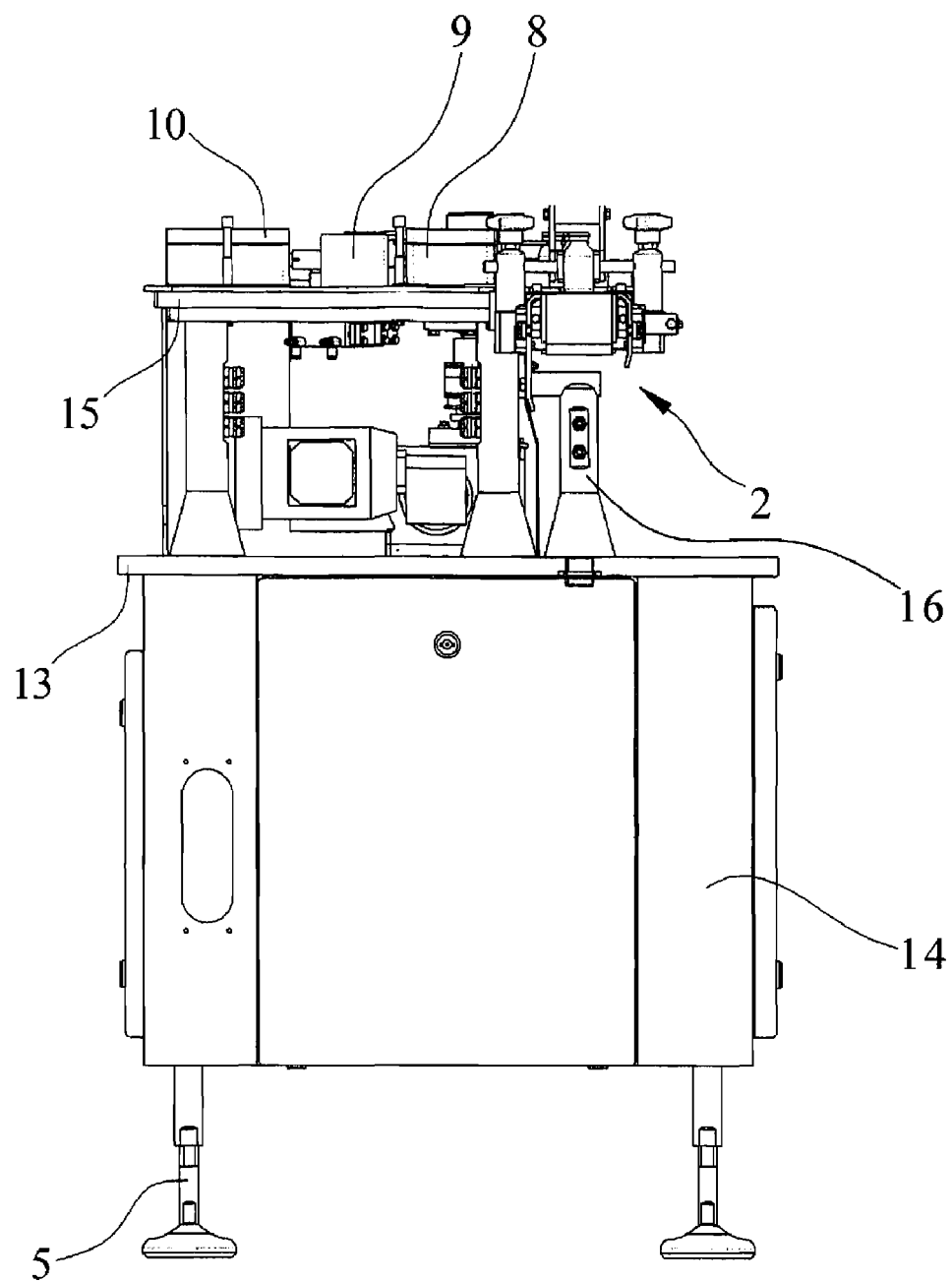
FIG. 4 shows a view in side elevation.

As can be seen in the drawings, the apparatus of the present invention comprises an anti-reflective enclosure 1 which surrounds the whole of the functional devices of the apparatus, so that communication with the outside of said enclosure will take place exclusively by means of the passages for the entry 2 and exit 3 of the containers, nevertheless having a front door 4 for inspection and maintenance of the apparatus, which will customarily be arranged on adjustable-height feet 5 to enable it to be easily levelled.

In the version with circular plate, the apparatus comprises a revolving plate 6 which will pick up in succession the containers proceeding from the entry 2 and which by way of example have been shown with the numbers 7, 7', 7". On the periphery of the circular plate 6 is arranged the assembly 8 for the pre-ionisation electrode, the artificial vision camera 9 and the electrode holder 10 for the formation of the arc. The respective electrodes can be seen more clearly in FIG. 5, being designated by the numbers 11 and 12. The whole assembly of devices is mounted on the table 13, which forms the upper part of a base casing 14 carrying the control devices for the machine.

The assembly formed by the plate 6, the pre-ionisation station 8, the CCD camera 9 and the high voltage electrode assembly 10 is mounted on an exchangeable intermediate insulating base 15', and this is in turn mounted on the base 15, which is incorporated in the support panel 13 by means of the adjustable feet 16, variable in number, corresponding to four in number in the example shown.

Figure 6:
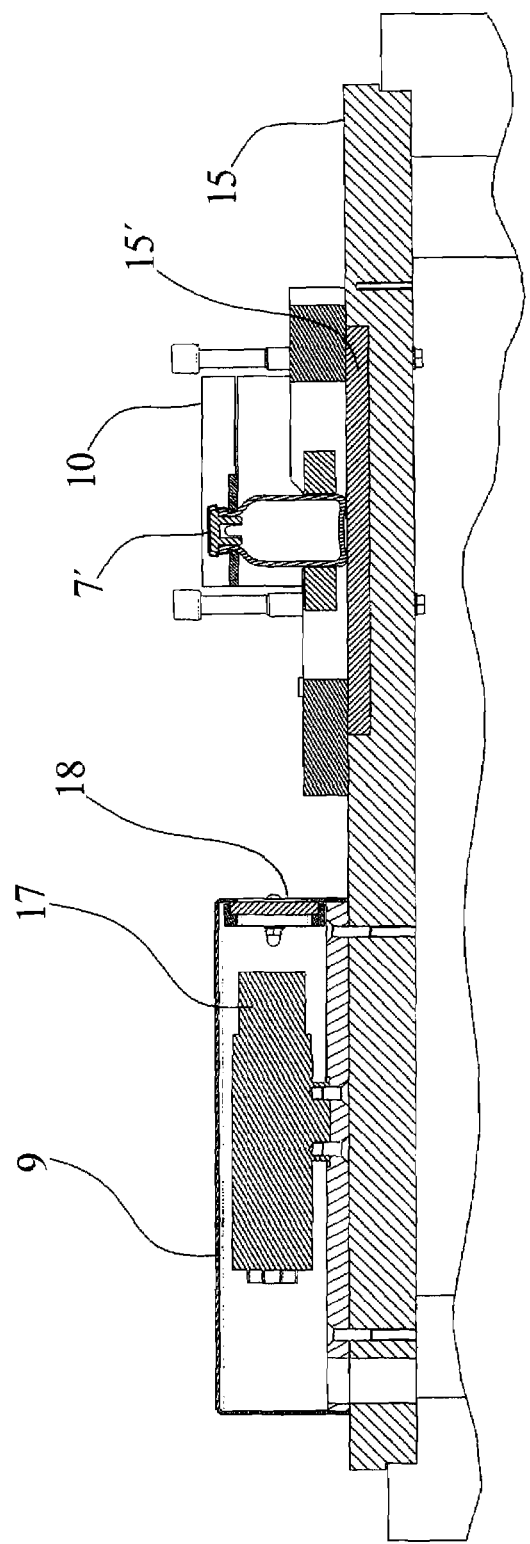
FIG. 6 shows diagrammatically a section through the plane indicated in FIG. 5.

The CCD camera mounted inside the protective casing 9 has been shown by the number 17 in FIG. 6, being able to capture the formation of the arc inside the container through the front protection 18.

Figure 5:
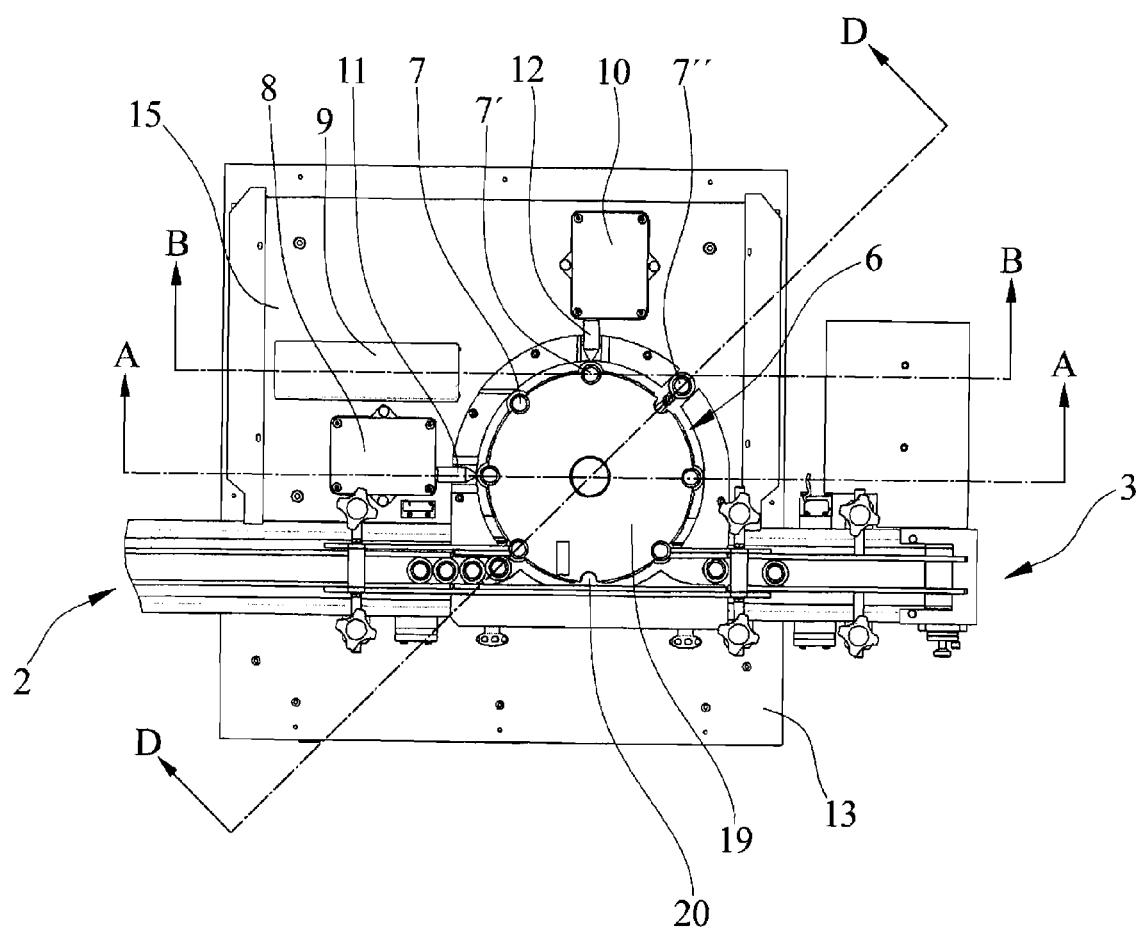
FIG. 5 shows a detail of a plan view.
Figure 7:
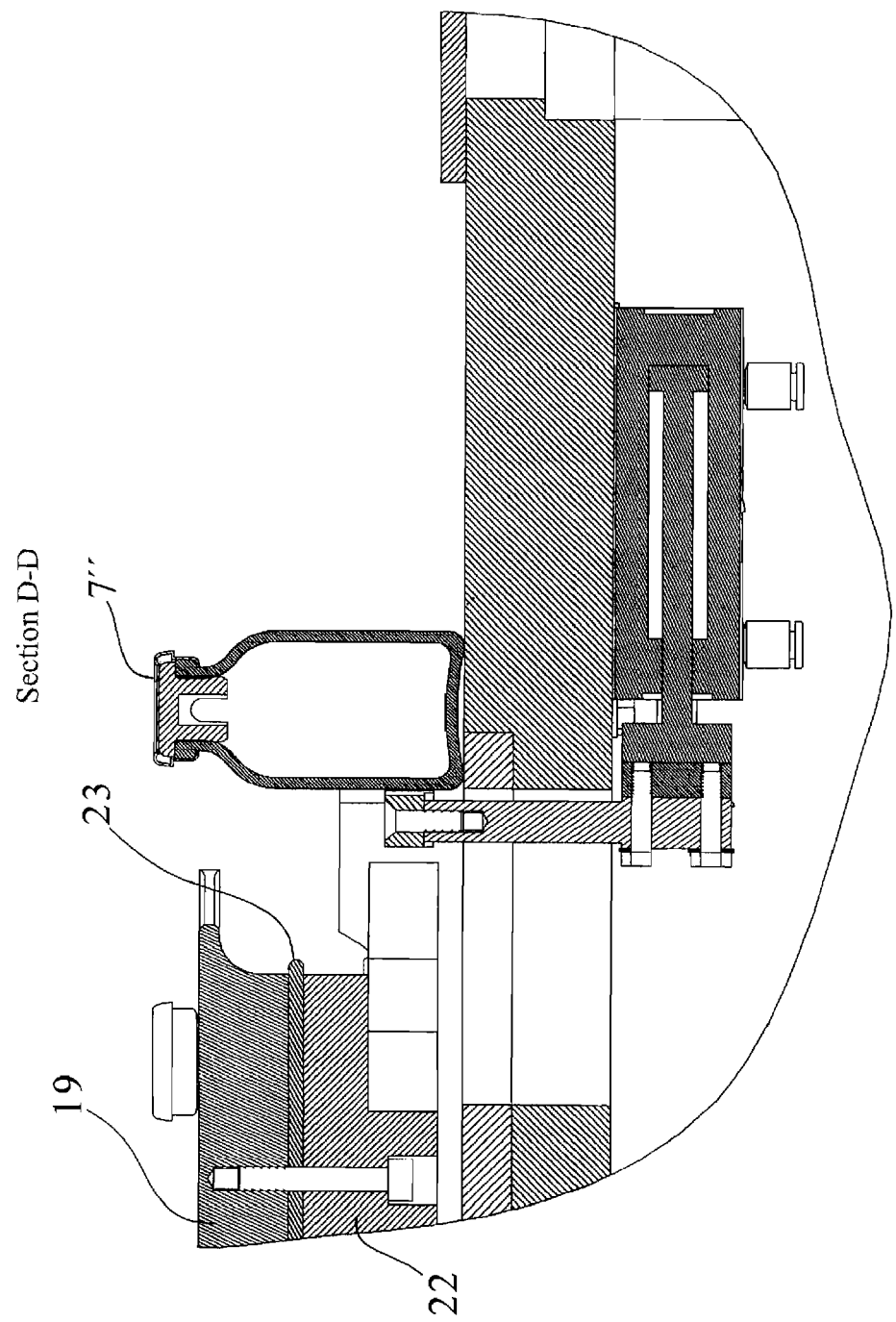
FIG. 7 shows a detail in section through the section line indicated in FIG. 5.
Figure 8:
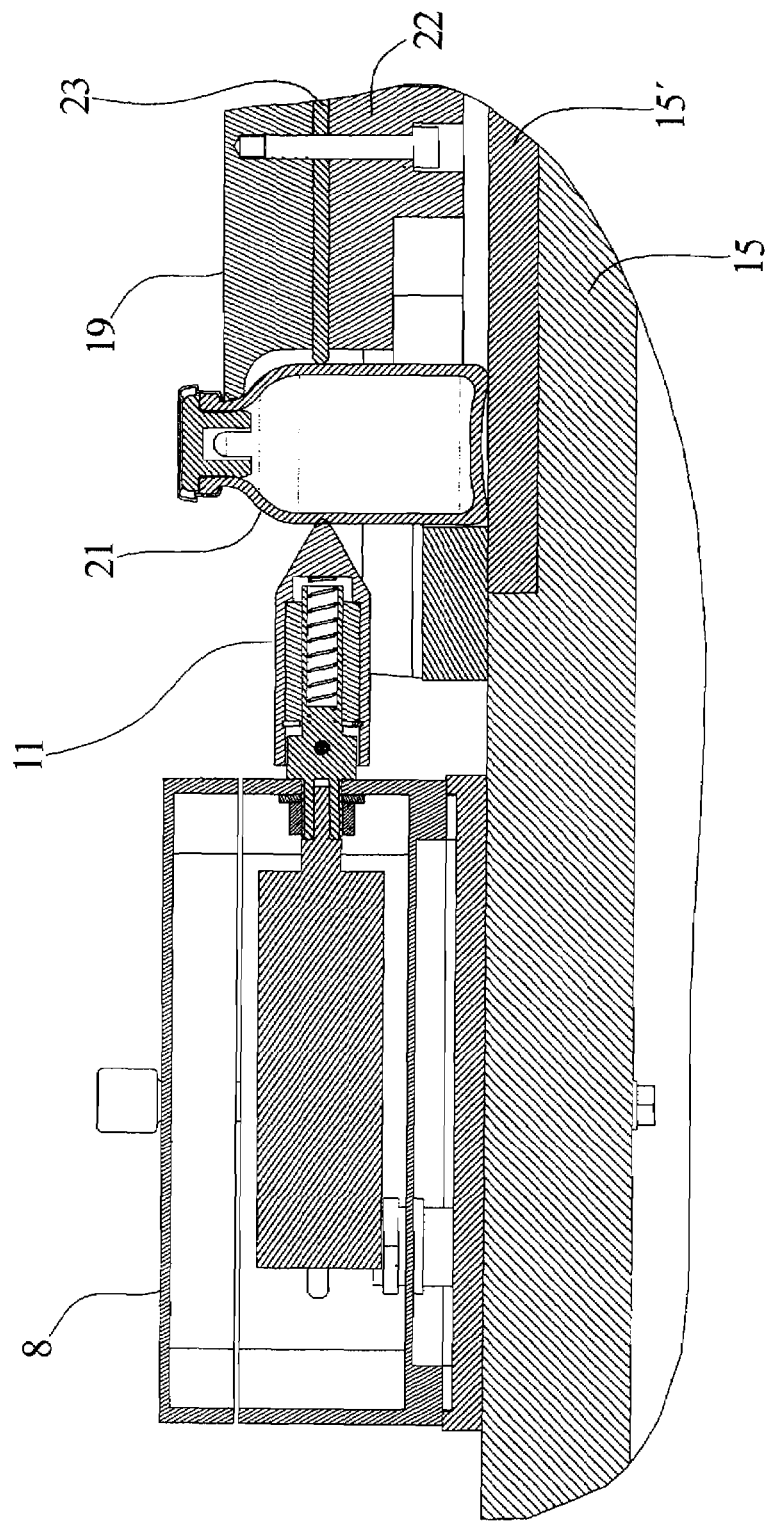
FIG. 8 shows another detail in section through the section plane likewise indicated in FIG. 5.
Figure 9:
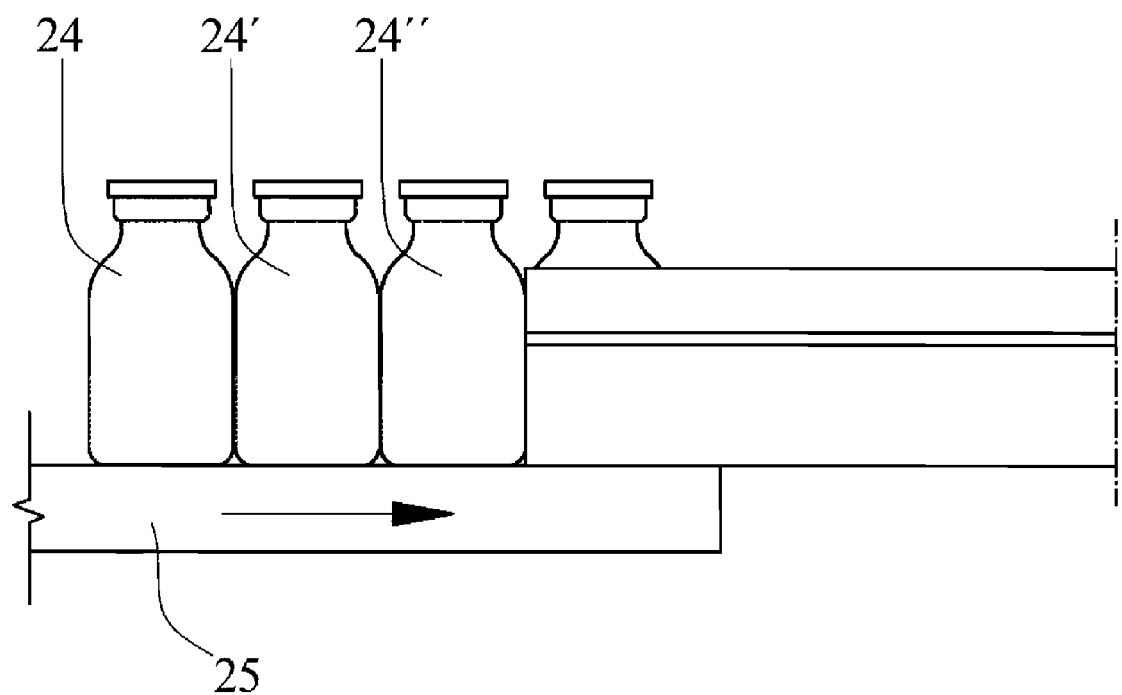
FIGS. 9 to 13 show diagrammatically the handling of the containers according to the process and apparatus of the present invention.
Figure 10:
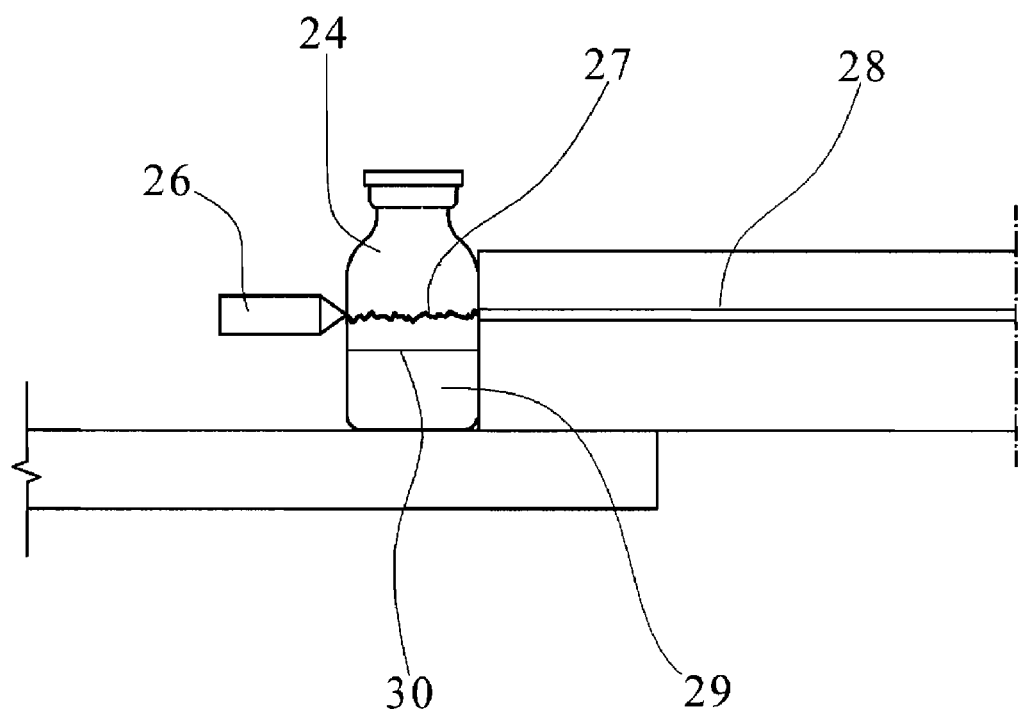
Figure 11:
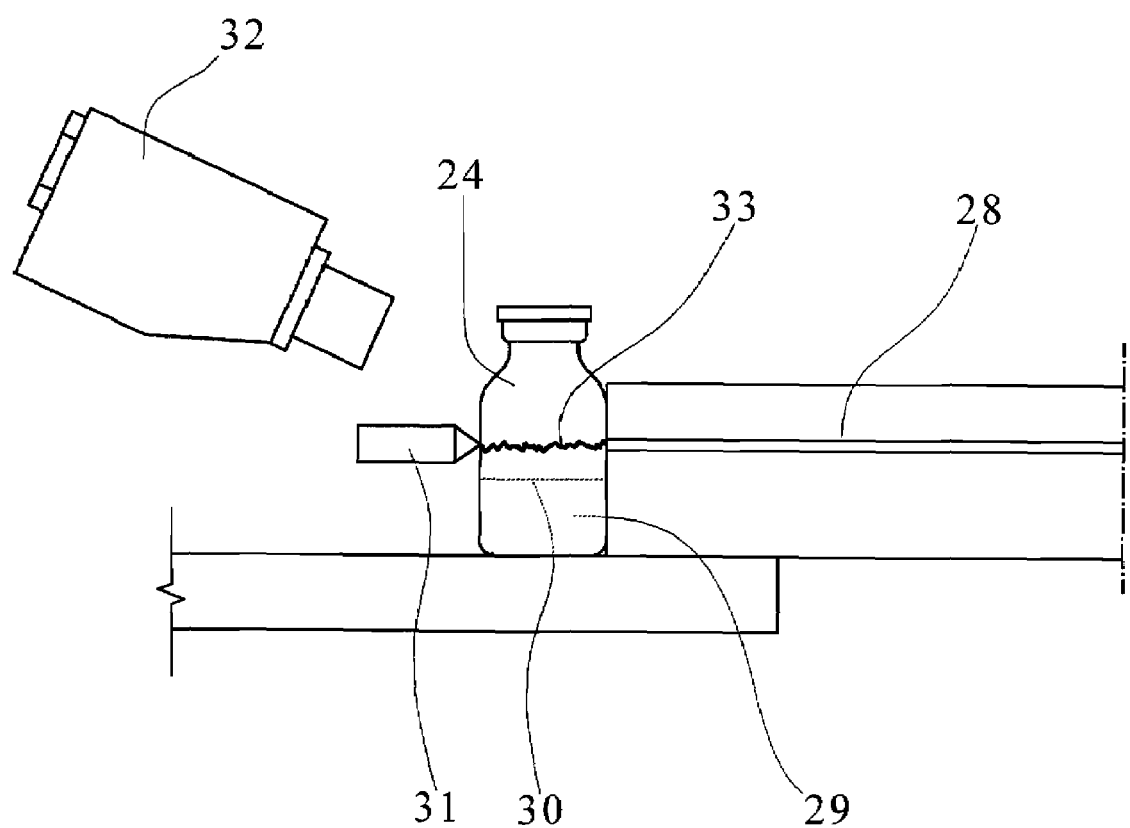
Figure 12:
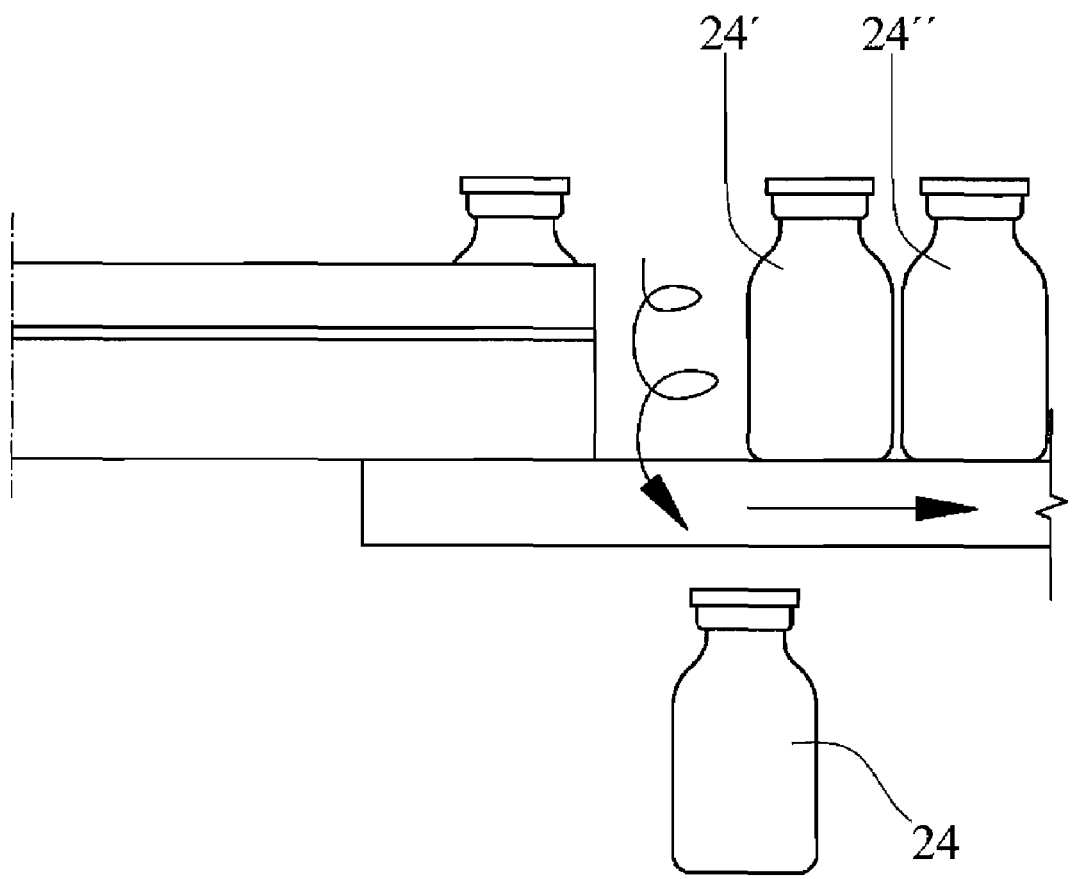
Figure 13:
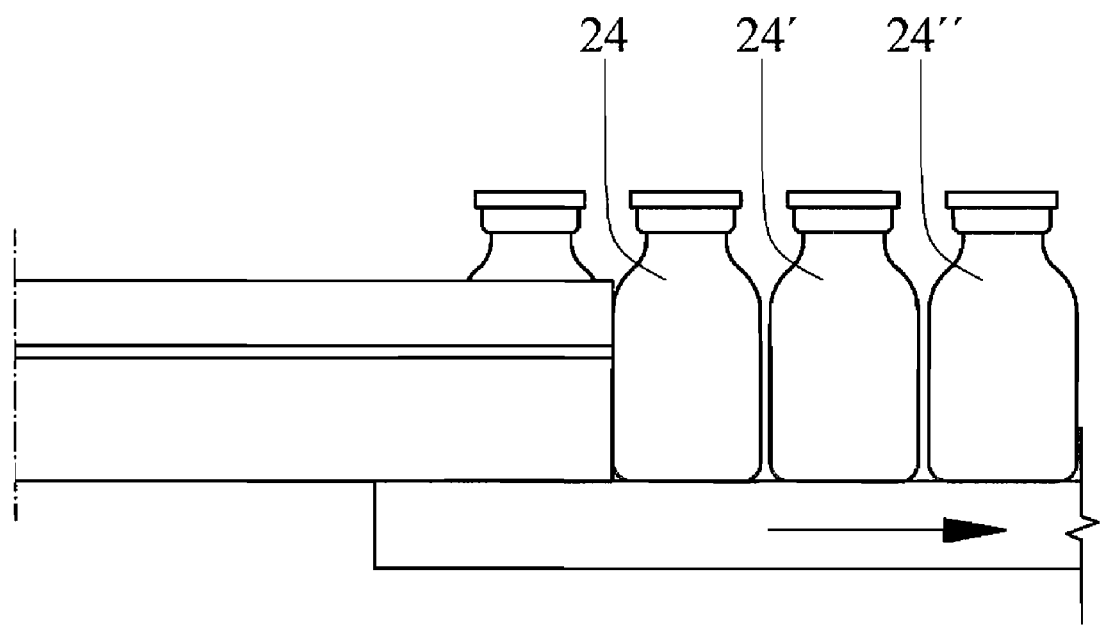

The revolving assembly 6 has an upper plate 19, FIGS. 5 and 8, bearing re-entrants 20 intended for the individual pick-up of the containers such as the container 21 shown in FIGS. 7 and 8, which is guided on the exchangeable insulating base 15' and which is in contact with a disc functioning as an earth electrode 23, located at height above that of the product contained in the container 21, between the plates 19 and 22, while the electrode, for example, the pre-ionisation electrode 11 and also the main electrode 12, together with the disc 23, determine the route by which will pass the discharge, which will be captured by the vision camera for the purpose of its comparison and determination of whether or not it reaches the degree of vacuum desired in the container.

The invention may be produced both with movable-type support means for the earth electrode and with fixed-type support means.

In the case where it is determined that the degree of vacuum is insufficient, a command will be emitted for the expulsion of the container which will result in the exit of the rejected container, for example, the container 7" shown in FIG. 5, through an opening existing in the guides of the circular plate of the apparatus, an ejector arm acting on the corresponding container.

FIGS. 9 to 13 show diagrammatically the different stages of the process, it being possible to see firstly the entry of the containers in alignment on an entry guide 25, the recipients being designated by the numbers 24, 24', 24". In the pre-ionisation stage shown in FIG. 10, the pre-ionisation electrode 26, which corresponds to the electrode 11 shown in FIG. 5, applies a voltage for pre-ionisation of the container, it being possible to observe the formation of the arc 27 between said electrode 26 and the electrode 28 arranged opposite. The content of the lyophilised material 29 inside the container 24 determines that its level 30 remains below the zone of influence of the arc.

The containers are then fed to the stage of inspection with energising of the container in which the energising electrode 31 will apply a high voltage to create the discharge 33, which will be evaluated by the CCD camera 32, qualitatively comparing the luminous intensity of the arc formed 33 with the values determined previously in accordance with the criterion for acceptance and rejection, which will effect the qualification of the container 24 as acceptable or to be rejected. It may therefore represent: a) the expulsion of the container 24 into the zone in which there is sufficient room for it (as can be observed in FIG. 12), after having generated an expulsion impulse, or b) the continuation of the containers to subsequent stages, as can be observed in FIG. 13, in which the alignment of the containers 24, 24' 24" is continued, since there is no expulsion of any of them.

Figure 14:
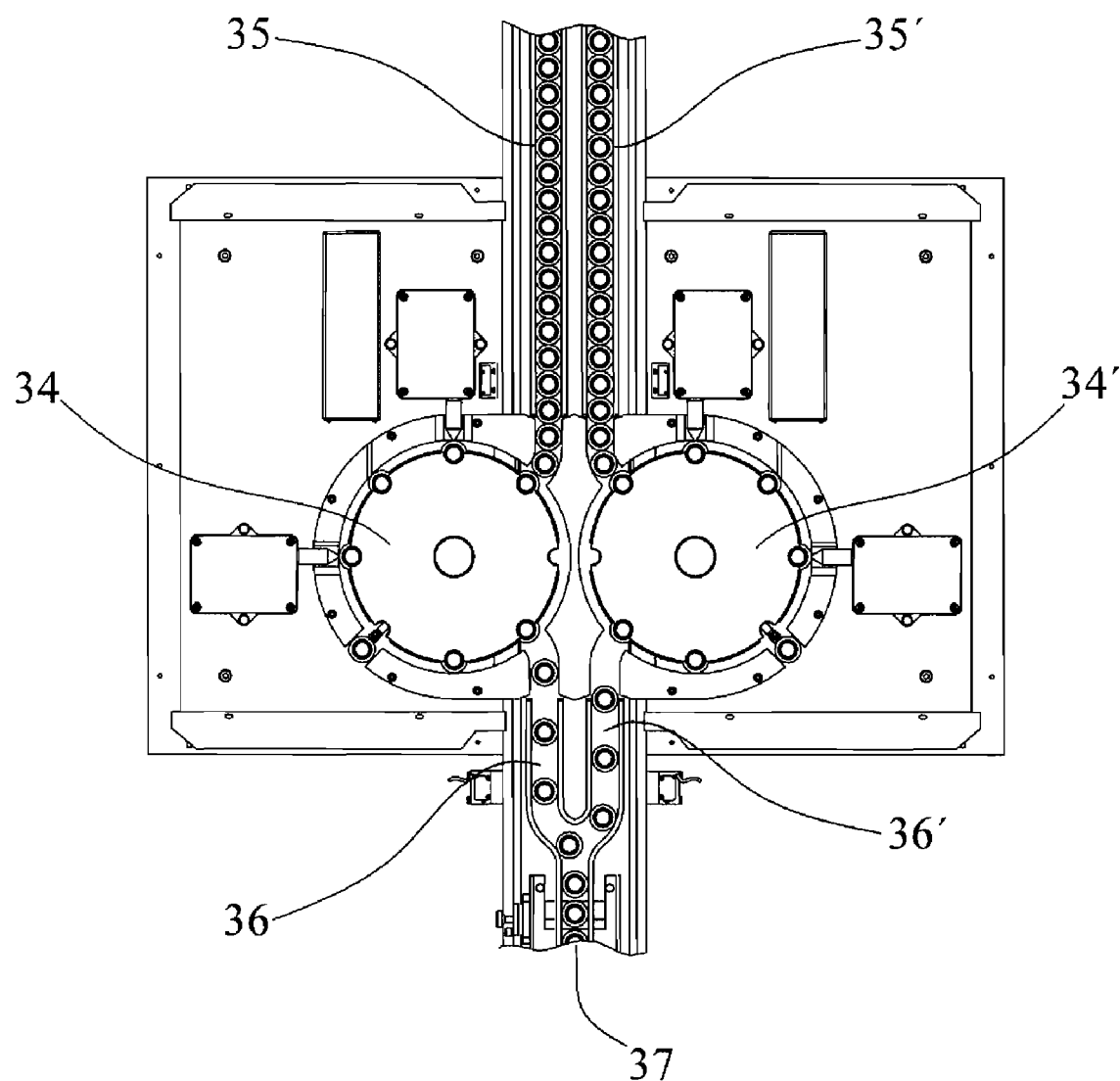
FIG. 14 shows diagrammatically a plan view of a version of the apparatus with two revolving plates with their respective feed channels.

FIG. 14 shows an alternative embodiment with double head, that is to say, equipped with two circular plates 34 and 34' of similar structure to that explained previously, each equipped with its own feeding system 35 and 35' and its own outlets for accepted containers 36 and 36' which may optionally emerge, combined together, in a single outlet 37.

Figure 15:
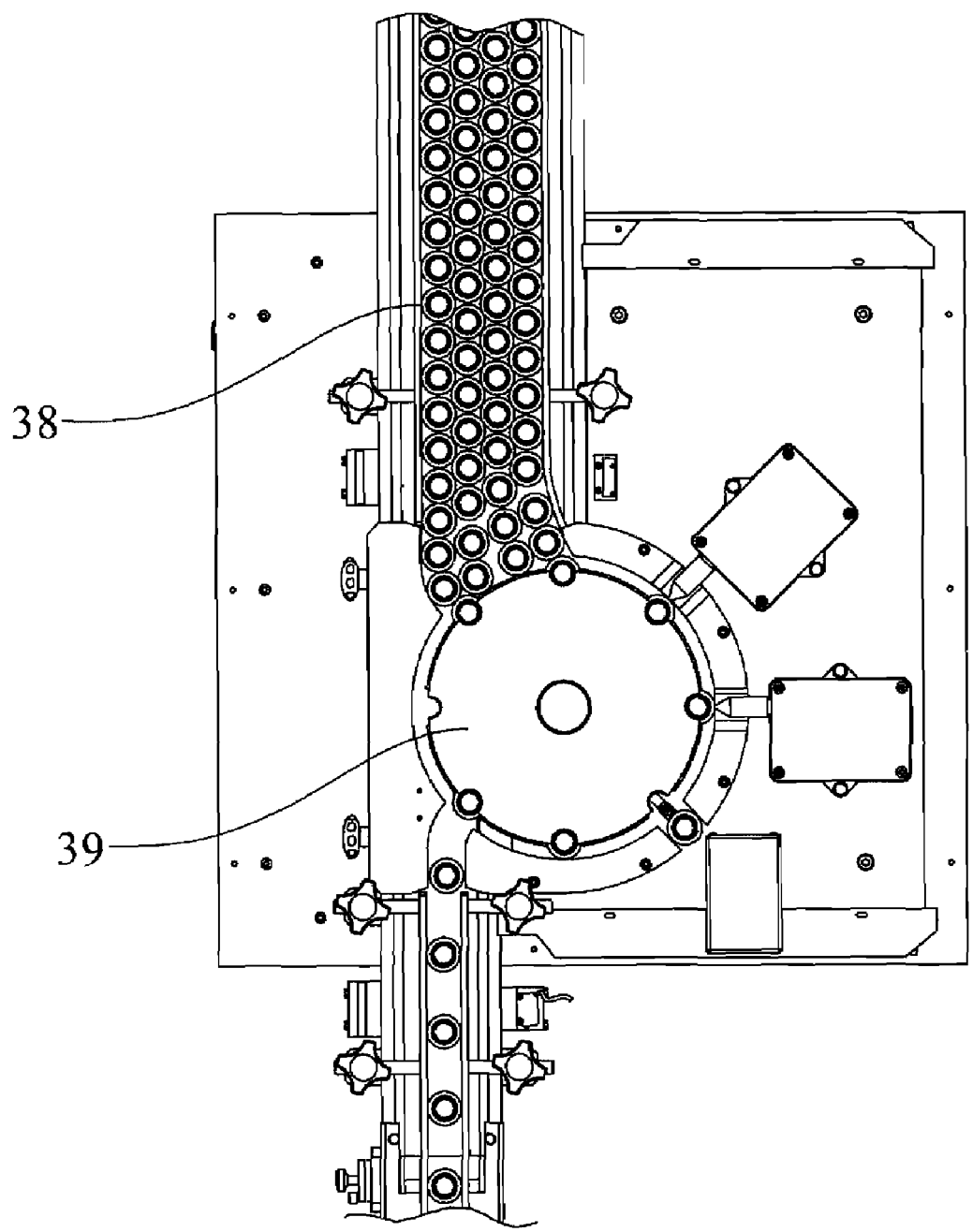
FIG. 15 shows an exemplary embodiment of the apparatus with a multiple entry for the feeding of a single revolving plate.

FIG. 15 shows an embodiment of a feed for the apparatus in multiple form, that is to say, instead of the feeding of containers aligned in a single line per plate, providing multiple feeding by means of multiple lines of containers as shown with the guide 38 in FIG. 15 which will make it possible to feed the containers to the plate 39, for example, two by two or in general in a variable number greater than one.

As will be understood, by means of the present invention it becomes very practical and economic to subject the containers which contain lyophilised pharmaceutical products to automated 100% inspection of the degree of internal vacuum of the container, in order to determine which of them might need to be rejected.

Both the apparatus and the process have been explained according to the exemplary embodiments and appended drawings. Nevertheless, it should be understood that experts in the field, on the basis of what is disclosed in the present invention, may introduce many variations which will be comprised within the scope of the invention if they are included in the scope of the attached claims.

The invention claimed is:

1. A process for evaluating the degree of vacuum in closed bodies with transparent walls, by means of formation of an arc across each closed body by the application of an electrical field, said process comprising the following consecutive operating stages:

feeding the bodies to be inspected in succession;

transferring the bodies to means bearing an earth electrode;

moving the bodies along a path determined by the means carrying the earth electrode in contact with same;

application of one or more pre-ionisation charges at one or more points on the transport path;

application of one or more checking electrodes applying one or more high voltage charges in order to produce the electric arc across each body between said electrodes and the earth electrode or electrodes;

inspecting the arc or arcs formed inside said body by means of respective artificial vision cameras;

subjecting the reading taken by the artificial vision cameras to an algorithm for evaluation of the arc;

referencing the bodies according to the result of the arc evaluation for their selection;

generating signals for differentiated exit of the bodies.

2. A process according to claim 1, wherein the algorithm for evaluation of the arc permits the selection of the bodies by a threshold value of the degree of vacuum above which the product will be accepted.

3. A process according to claim 1, wherein the algorithm for evaluation of the arc permits the classification of the bodies by level within a range with predetermined maximum and minimum of the vacuum level.

4. A process according to claim 1, wherein the algorithm for evaluation of the arc makes it possible to effect the selection of the bodies by chromatic identification.

5. A process according to claim 1, wherein the algorithm for evaluation of the arc permits the classification of the bodies by the form of the luminosity generated by the arc.

6. A process according to claim 1, wherein the algorithm for evaluation of the arc permits the classification of the bodies by comparison with a master image regarded as acceptable.

7. A process according to claim 4, wherein chromatic identification is effected by the distribution and values of the colours red, green and blue of the image captured by the vision camera.

8. A process according to claim 1, wherein the differentiated exit of the bodies takes place by separating the accepted bodies towards one outlet or several outlets and the unaccepted bodies to one outlet or several outlets.

9. A process according to claim 1, wherein the differentiated exit of the bodies takes place according to the estimated value of the level of vacuum therein.

10. An apparatus for evaluating the degree of vacuum in closed bodies with transparent walls, by the application of a high potential across the closed body, wherein it comprises means for guiding and transporting the bodies along a fixed path at a predetermined speed, the path comprising a first, pre-ionisation station and an earth electrode parallel to the path of movement and transport and in contact with the bodies during their transportation, the apparatus then having means for active checking intended for the application of a high voltage for the arc formation and the apparatus having an artificial vision camera arranged for the observation of the arc formed inside the body and having means for the application of an algorithm for evaluation of the arc formed in the body and the apparatus also having exit stations for rejected and accepted bodies.

11. An apparatus according to claim 10, wherein the means for guiding and transporting the bodies comprise a circular revolving plate arranged on a support table with the interposition of an interchangeable insulating panel, which plate bears pick-up seats for the individual bodies and an earth electrode which is capable of being contacted by each of the bodies as they move along the fixed path.

12. An apparatus according to claim 10, wherein the pre-ionisation station comprises one or more high voltage electrodes for the pre-ionisation of the bodies.

13. An apparatus according to claim 10, wherein the means for guiding and transporting the bodies comprise two revolving plates arranged in tandem with individual or common feeds and outlets for each plate.

14. An apparatus according to claim 10, wherein the active checking means for the application of voltage for forming the arc are constituted by one or more electrodes capable of generating a high voltage between the actual electrode and the earth electrode on which the body is in contact in order to permit the formation of the arc.

15. An apparatus according to claim 10, whereby arrangement of an enclosure for protection against the external luminosity and anti-reflective for the artificial vision camera.

16. An apparatus according to claim 10, whereby arrangement of the whole of the analysis apparatus within a light-absorbing enclosure, intended to absorb reflections in the stages of energising and measurement of the arc in the bodies.

* * * * *